R. S. SMITH.
CARBURETER.
APPLICATION FILED MAR. 22, 1915.
1,340,123.
Patented May 11, 1920.
2 SHEETS—SHEET 1.
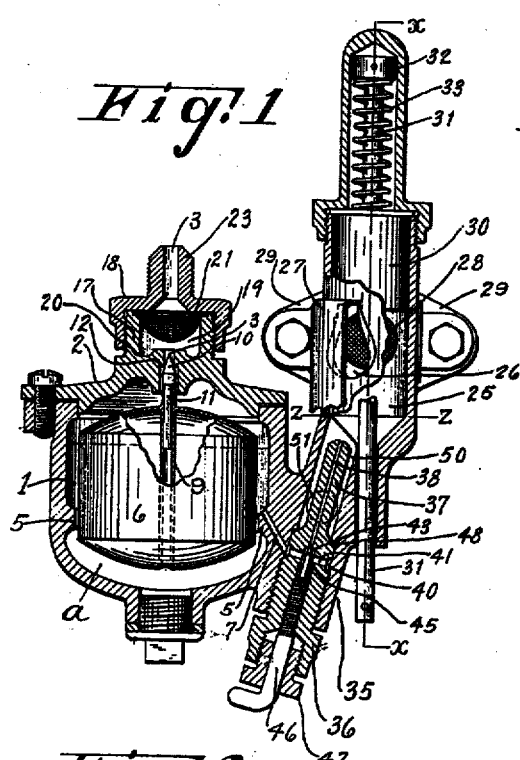
Fig. 1.
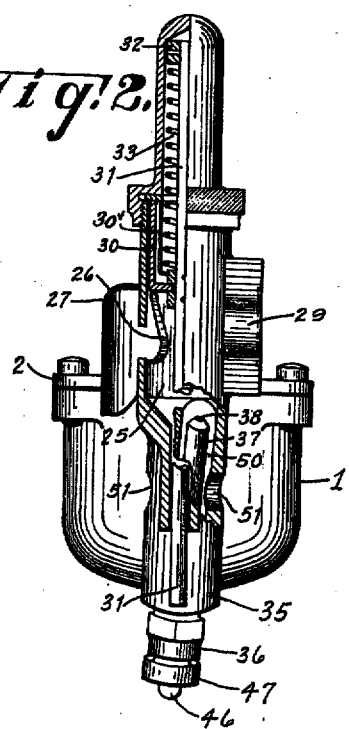
Fig. 2.
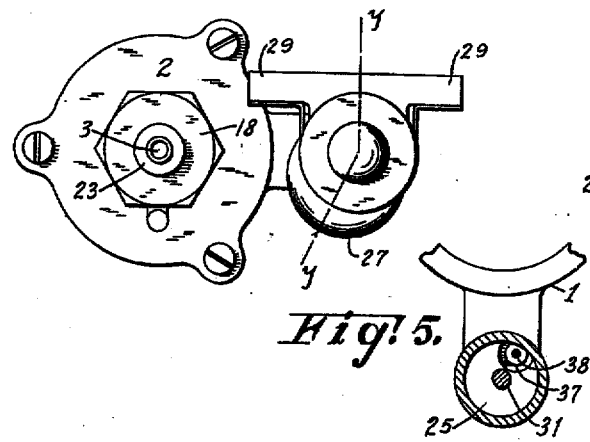
Fig. 3.
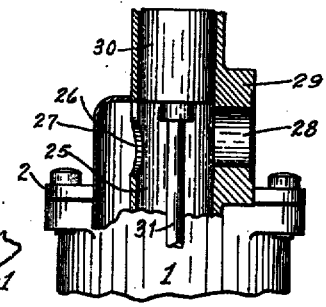
Fig. 4.
Fig. 5.
Inventor
Reuben Stanley Smith
By Erwin & Wheeler
Attorneys
Witnesses

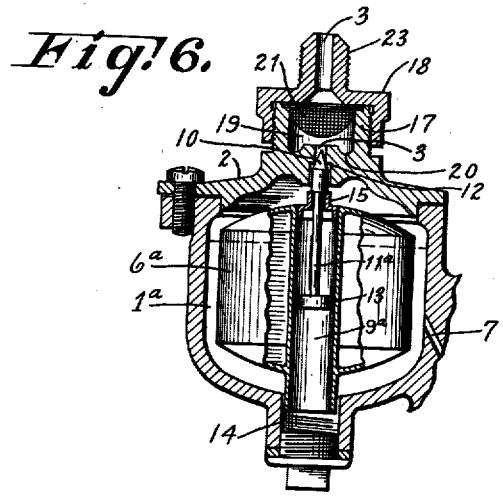
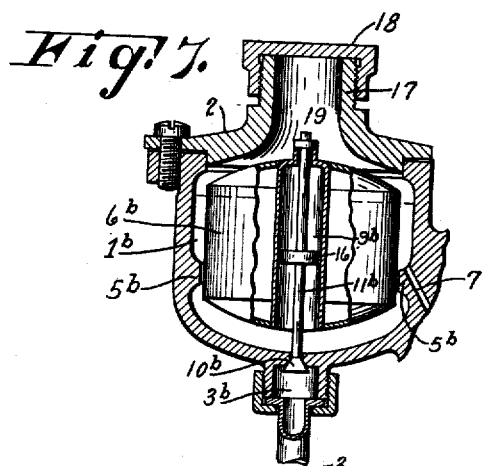
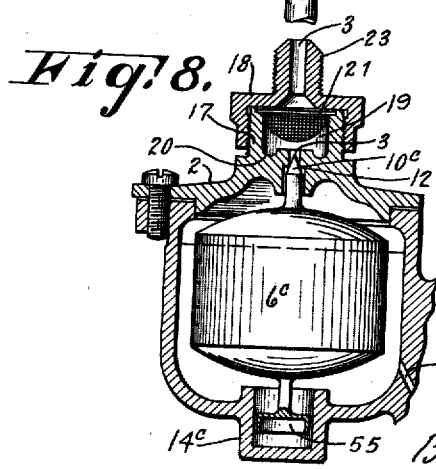

UNITED STATES PATENT OFFICE.

REUBEN STANLEY SMITH, OF MILWAUKEE, WISCONSIN, ASSIGNOR, BY MESNE ASSIGNMENTS, TO BRIGGS AND STRATTON COMPANY, OF MILWAUKEE, WISCONSIN, A CORPORATION OF WISCONSIN.

CARBURETER.

1,340,123.  Specification of Letters Patent.  Patented May 11, 1920.

Application filed March 22, 1915. Serial No. 16,010.

*To all whom it may concern:*

Be it known that I, REUBEN STANLEY SMITH, a citizen of the United States, residing at Milwaukee, county of Milwaukee, and State of Wisconsin, have invented new and useful Improvements in Carbureters, of which the following is a specification.

My invention relates to improvements in carbureters.

In the ordinary carbureters, liquid is fed from a reservoir into a so called float chamber, the inlet of which is provided with a rigidly connected float controlled valve, designed to maintain a constant level of liquid fuel in said chamber, and the outlet of which communicates with a fuel nozzle in a carbureting or mixing chamber adjacent to the float chamber. But it has been found that in carbureters of this type as heretofore constructed, if used on motor driven vehicles, the jolts, vibrations, and swinging movements of the vehicle are communicated to a greater or less extent to the float and valve. This tends to unseat the valve at times when the supply in the float chamber is already adequate or excessive and the carbureter therefore becomes flooded.

The objects of my invention are to provide a carbureter for internal combustion motors, such as are used in connection with motor driven vehicles, in which a substantially constant level of liquid fuel may be accurately maintained under conditions of road travel; also to provide an efficient carbureter of simple construction and light weight, adapted to the requirements of small power units.

Carbureter flooding is most commonly experienced in the smaller units and simpler structures. My invention is therefore peculiarly adapted to overcome the difficulties experienced in the operation of carbureters used on motor cycles and motor driven auxiliary wheels, such as are employed to propel bicycles or other vehicles with which the motor wheels are connected.

In the drawings—

Figure 1 is a vertical sectional view, drawn to a major plane common to the axes of the float chamber and mixing chamber, with a fragment of the mixing chamber illustrated in full to show the air inlet, and with the fuel nozzle shown in section on a minor plane, exposing the nozzle ducts throughout their length.

Fig. 2 is an elevation of my improved carbureter, with one-half of the mixing chamber illustrated in vertical section on the line *x—x* of Fig. 1, and with a portion of the casing partially broken away on the other side to expose the fuel nozzle and one of the air inlet ports.

Fig. 3 is a plan view.

Fig. 4 is a fragmentary sectional view, drawn on line *y—y* of Fig. 3.

Fig. 5 is a fragmentary cross sectional view, drawn on line *z—z* of Fig. 1.

Fig. 6 is a vertical sectional view of a float chamber embodying one of the principal features of my invention in modified form.

Figs. 7 and 8 are similar views showing further modifications.

Like parts are identified by the same reference characters throughout the several views.

The float chamber 1 is provided with a removable cover 2, having a centrally disposed inlet port 3. The float chamber is provided with an inwardly projecting annular flange 5, which serves as a guide for a cylindrical float 6. The float 6 extends loosely into or through the annulus 5, and the relative dimensions of the float and annulus are such as to partially confine the liquid below the annulus as at *a* and secure a dash pot effect without binding frictional contact between the float and the annulus 5. The float chamber is provided with an outlet port 7, adapted to provide a delivery of liquid fuel from a point in the float chamber above the annulus 5. The fluid in the outlet is therefore not subject to plunger pressure exerted by the float upon the fluid below the annulus.

A tube 9 extends vertically through the float, the interior of the tube being in communication with the space below the float. A valve 10 controls the delivery of fluid fuel to the float chamber through the inlet 3, said valve being preferably supported upon the upper end of the tube 9 and provided with a stem 11, loosely socketed in said tube. The inlet port 3 is provided with an interior annular shoulder at 12, which constitutes a seat for the valve 10, the inlet port 3 being enlarged below said seat as shown. The tube 9 preferably extends into this enlarged portion of the inlet port 3, the walls of which may constitute a guide coöperative with the valve 3 and annulus 5 in supporting the float against lateral movements.

Relative vertical movements of the float in either direction are retarded or minimized by liquid fuel in the lower portion of the float chamber, which liquid must pass between the float and the annulus 5 in one direction or the other to permit such movement. A quick upward movement of the float therefore tends to create a vacuum below the annulus 5, while a quick downward movement of the float creates a pressure in that portion of the chamber below the annulus. The development of this pressure enables me to prevent such float vibrations from admitting an excess of liquid to the float chamber, by providing means whereby this pressure may be exerted upon the valve to hold it to its seat. Owing to the fact that the valve is not positively connected with the float, but is loosely socketed therein, the valve tends to retain its position upon the seat by inertia, but by extending the socket or tube 9 downwardly through the float and admitting thereto fluid from the space below the float, it is obvious that any quick downward movement of the float sufficient to develop a pressure below annulus 5, will force some of the liquid upwardly in the tube 9 against the lower end of the valve stem 11, thereby utilizing this pressure to hold the valve 10 to its seat 12. The valve stem 11 preferably extends substantially to or below the level of liquid in the float chamber, and as this stem serves as a plunger in the tube 9, it is obvious that any upward movement of liquid in said tube will immediately exert pressure upon the valve.

I do not limit the scope of my invention to the specific means above described for utilizing the downward pressure of a vibrating valve supporting member or float in a reservoir or float chamber to develop a counter pressure of the liquid in such chamber upon the valve and thereby prevent it from being unseated by vibrations of the valve supporting member or float, at times when the supply of liquid in the float chamber is adequate. In Fig. 6 I have illustrated a float 6ª, having a vertical passage 9ª therein, which is of much larger diameter than the tube 9, shown in Fig. 1. In this construction, the valve stem 11ª is comparatively small and is provided with a plunger or piston 13, near its lower end, which substantially fills the passage 9ª. In this construction also, instead of providing the annulus 5, I construct a float chamber 1ª with a cylindrical downward extension 14 of reduced diameter, and the tube 9ª extends downwardly into this cylindrical portion 14, substantially filling the same, so that whenever the float 6ª is subjected to a quick downward vibration, some of the liquid in the cylindrical extension 14 will be forced upwardly against the piston or plunger 13. The valve 10 is supported from the float by a rest 15, which also serves as a guide for the stem 11ª.

In Fig. 7 I have illustrated this feature of my invention embodied in a float chamber, which has an inlet 3ᵇ at the bottom, and a valve 10ᵇ seating with the pressure of the liquid in the inlet port. In this construction, the float 6ᵇ is also arranged in dash pot relation to an annulus 5ᵇ, projecting inwardly from the walls of the float chamber 1ᵇ. The float is provided with a comparatively large tube 9ᵇ, and the valve is suspended from the float by a valve stem or rod 11ᵇ. This stem also is provided with a piston 16, substantially filling the tube 9ᵇ as shown. In this construction, the pressure developed in the liquid below the annulus 5ᵇ will of course tend to force the valve from its seat, but the piston 16 is of considerably larger diameter, and this being also subject to the liquid pressure exerted in an upward direction, the pressure upon the piston will be more than sufficient to counteract the downward pressure upon the valve. Owing to the fact that the valve in this construction closes with the pressure, the necessity for counteracting the vibratory movements of the float is not as great as it is where the valve seats against the pressure of the liquid in the float chamber inlet port. But my invention can be applied wherever the conditions are such that the valve is likely to become unseated through float vibration. In Fig. 8 a float 6ᶜ carries a depending piston or plunger 55, whereby it is brought into dash pot relation to the wall of a reduced downward extension 14ᶜ of the float chamber. In this construction also I have shown the needle valve 10ᶜ as rigidly connected with the float, the form of connection not being essential to the dash pot feature of my invention.

The dash pot feature of my invention is also of value in preventing or retarding upward movements of the float. Such upward vibrations are always followed by downward vibrations, and if not retarded, damage is also likely to result to the valve and its seat through the hammering effect of the valve upon its seat in case a vibration should occur when the valve is open. Owing to the fact that the valve is not fixed to the float, it it obvious that it will also be little affected by lateral vibrations of the float, such lateral vibratory movements being extremely short, owing to the substantially close fit in the guides. It will of course be understood that the term "piston" as used in this description, does not imply that the member thus designated fits closely to the walls of the tube or passage in which it is located. The fit will be sufficiently loose to avoid friction.

The cover 2 of the float chamber may be provided with an upwardly projecting annular flange 17 having a cap 18, preferably threaded thereon and inclosing a chamber 19, the wall of which has an annular depression 20 encircling the inlet port 3. A filtering screen 21 is clamped upon the flange 17 by the cap 18, and any sediment passing through this screen collects in the channel 20. A coupling nipple 23 affords means for connecting the float chamber with any suitable source of liquid fuel supply.

The mixing chamber 25 is preferably tubular in form and is provided with an air inlet port 26, which may be covered by a shield 27. An outlet port 28 is preferably located on the opposite side of the mixing chamber but offset from a diametrical line crossing such chamber from the air inlet port 26. In the construction shown, the exterior wall of the chamber 25 is flattened and provided with laterally projecting coupling ears 29 to facilitate connecting the carbureter with an internal combustion motor or with a duct leading to the cylinder or cylinders thereof. The shield 27 tends to exclude dust. It is spaced from the outer surface of the wall of chamber 25 and forms an air admission passage closed at top and sides and through which passage air passes from the bottom upwardly to the port 26.

A piston throttle valve 30 is located in the upper portion of chamber 25 and is provided with an actuating stem 31, having a head 32 at its upper end and extending downwardly through the throttle valve 30 and the chamber 25 to an exterior point. A compression spring 33 is interposed between the head 32 of the stem and a suspended stop 30' which is adapted to extend into the open upper end of the valve when the latter is in raised position, said spring being also preferably partially socketed in the valve when the latter is in normal or raised position. A downward movement of the throttle valve simultaneously and progressively closes the air inlet 26 and the mixture outlet 28. The air inlet is, however, enlarged downwardly and is formed with a view to securing a proper mixture during the various stages of valve movement. The exposed lower end of the valve stem 31 is of course adapted to be connected for operation from any desired point at which manual power may be applied. The spring 33 tends to hold the throttle valve in open position, from which position it is moved toward closing position by a downward pull applied to the stem 31.

The mixing chamber and float chamber are connected (preferably integrally) by a member 35, which has a tubular opening therethrough to receive a removable nozzle member 36 threaded into the lower end of the member 35 and having an upper end portion 37 of reduced diameter, which constitutes the nozzle proper, the same having a longitudinal nozzle passage 38 for fuel delivery. The upper end of this nozzle member extends to the interior of the mixing chamber, and the fuel nozzle passage 38 is so disposed as to deliver the fuel along a diagonal line in the direction of the interior wall of the mixing chamber 25 between the air inlet 26 and the outlet 28. The outlet port 7 of the float chamber leads to an annular cavity 40 in the nozzle member 36, from which cavity cross ducts or ports 41 extend inwardly and communicate with the nozzle passage 38. This nozzle passage has an annular shoulder at 43, forming a seat for a needle valve 45, the latter having a stem 46, threaded into the lower end of the nozzle member and extending through a packing nut 47. The shoulder, formed by reducing the upper end of the nozzle member 36, seats against an annular shoulder 48 formed on the interior wall face of the member 35. Above this point the nozzle member does not fill the opening in the member 35 and an annular passage 50 is therefore formed, which leads upwardly from the shoulder 48 to the interior of the mixing chamber 25 and constitutes an air nozzle. Air inlet ports 51 extend laterally through member 35 and communicate with this passage 50, whereby, when a partial vacuum is created in the chamber 25 by suction of the motor piston, an atomizing current of air will be delivered past the outlet of fuel nozzle 37, which will create an additional suction at the nozzle outlet and facilitate breaking up or atomizing the liquid fuel discharged therethrough. The fuel will be additionally atomized by striking the opposing wall of the mixing chamber. The shield 27 will prevent any of the liquid from being wasted by rebounding through the air inlet 26. Any such liquid will adhere to the shield and be vaporized by the entering current of air, either during the same or the succeeding suction stroke.

It will be observed that the nozzle duct 38 discharges the liquid not only angularly across the mixing chamber 25, but also delivers it obliquely with reference to the stem 31. The air entering through air nozzle passage 50 is delivered in the same direction and owing to the fact that the wall of chamber 25 is curved, a whirling current is thus developed in the mixing chamber, which greatly facilitates mixing the air and hydrocarbon.

I claim—

1. A carbureter, including a float chamber provided with an inlet, in combination with a valve controlling deliveries through said inlet, a float normally controlling said valve, and means for utilizing vibratory movements of the float, to develop fluid pressure upon the valve.

2. A carbureter, including a float chamber provided with an inlet, in combination with a valve controlling said inlet, a float normally supporting said valve, and means for utilizing vibratory movements of said float to develop a pressure on said valve in the direction of its closed position.

3. A carbureter, including a float chamber, in combination with a float, a fuel inlet valve loosely supported thereby, and fluid pressure actuated means for supporting the valve independently of the float.

4. A carbureter, including a float chamber, in combination with a float therein and in dash pot relation thereto, the arrangement being such that the vibratory movements of the float are limited by the partial confinement within the float chamber of a portion of the liquid in which the float is supported.

5. A carbureter, including a float chamber, a float therein and in dash pot relation thereto, and a fuel inlet valve loosely connected with the float, the arrangement being such that the vibratory movements of the float are directed by partial confinement of a portion of the liquid in the float chamber.

6. A carbureter, including a float chamber, a float therein, in dash pot relation thereto, a valve loosely connected with the float and exposed to pressure of the liquid in the space below the float, whereby, when the float vibrates, its downward movement will develop liquid pressure upon the valve to hold the latter to its seat.

7. A carbureter, including a float chamber, in combination with a float, a valve, and means for utilizing quick movements of the float in one direction to apply fluid pressure to the valve in the other direction.

8. A carbureter, provided with a float chamber having a downwardly discharging fuel inlet port, in combination with a float in said chamber, and a needle valve loosely socketed in said float and seating in said inlet port.

9. A carbureter, including a float chamber provided with an inlet at the top, in combination with a float in said chamber in dash pot relation thereto, and a valve seated in said inlet and loosely supported by the float, the float being free to vibrate independently of the valve.

10. A carbureter, including a float chamber, in combination with a float in said chamber, an annulus projecting into the float chamber around said float to form a dash pot, said chamber having an outlet above said annulus and an inlet in its top, and a valve loosely socketed in the float and controlling the inlet.

11. A carbureter, consisting of the combination of a chamber provided with a centrally located fuel inlet port in its upper portion, a float in said chamber provided with a tubular socket centrally located directly below said fuel inlet, a valve having a stem loosely seated in said socket and provided with a tapered upper extremity seated in the fuel inlet port, said float being adapted to vibrate independently of the valve.

12. A carbureter, including a float chamber provided with an inwardly projecting annulus located below the normal level of the liquid in said chamber, and a float in said chamber projecting loosely through said annulus.

13. A carbureter, including a float chamber, a float in said chamber and in dash pot relation thereto, and a fuel inlet valve supported by the float, whereby the vibratory movements of the float are limited by the partial confinement of a portion of the fluid in the float chamber.

14. A carbureter, including a float chamber and a float seated in said chamber in dash pot relation thereto, said float chamber having an outlet located at a point exterior to the dash pot portion of the chamber.

15. A carbureter, consisting in the combination with a float chamber provided with a fuel inlet in the central portion of its top, a float, a needle valve loosely socketed in the float at the vertical axis thereof, with its point adapted to be seated in said inlet, and an annular projection on the inner wall of the float chamber near the bottom of the float, through which the float projects in dash pot relation thereto.

16. A carbureter, including a float chamber provided with a top wall having a vertically disposed inlet port, the walls of which are annularly shouldered at an intermediate point to form a valve seat, a float in said chamber, provided with an upwardly projecting tubular stem projecting into said port and guided by the walls thereof below said seat, a valve adapted to close upon said seat and provided with a stem loosely socketed in the tubular float stem, and means for loosely guiding the lower end of said float.

17. A carbureter, including a float chamber provided with a top wall having a vertically disposed inlet port, the walls of which are annularly shouldered at an intermediate point to form a valve seat, a float in said chamber, provided with an upwardly projecting tubular stem projecting into said port and guided by the walls thereof below said seat, a valve adapted to close upon said seat and provided with a stem loosely socketed in the tubular float stem, and means for loosely guiding the lower portion of said float and retarding displacement of liquid hydrocarbon from the under side thereof, said float chamber having an outlet located above the liquid retarding means, substantially as described.

18. A carbureter comprising a float chamber, in combination with devices for maintaining a substantially constant fuel level in said float chamber, said devices including a float in dash pot relation to said float chamber, whereby a portion of the fluid is in partial confinement in the float chamber, and serves to limit the vibratory movements of the float.

19. A carbureter including a float chamber, a float therein in dash, pot relation thereto, a valve loosely connected with the float, and means for utilizing vibratory movements of the float to apply pressure of liquid from the space below the float to the valve when the float moves away from valve holding position.

20. A carbureter comprising in combination a float chamber and devices for maintaining a substantially constant fuel level in said float chamber comprising a float, a fuel inlet valve having lost motion connection with said float and arranged to be held in closed position by fluid pressure from beneath the float when the float moves quickly downward, and adapted to be normally held closed by the float when the liquid fuel in said float chamber attains a pre-determined level.

In testimony whereof I affix my signature in the presence of two witnesses.

REUBEN STANLEY SMITH.

Witnesses:
LEVERETT C. WHEELER,
IRMA D. BREMER.